(12) United States Patent
Desai et al.

(10) Patent No.: US 9,984,365 B2
(45) Date of Patent: May 29, 2018

(54) DEVICE IDENTIFICATION BASED ON DEEP FINGERPRINT INSPECTION

(71) Applicant: CA, INC., New York, NY (US)

(72) Inventors: Suril Desai, Bangalore (IN); Swaminathan Narayanan, Bangalore (IN); Akash Rai, Mumbai (IN)

(73) Assignee: CA, INC., New York, NY (US)

( * ) Notice: Subject to any disclaimer, the term of this patent is extended or adjusted under 35 U.S.C. 154(b) by 682 days.

(21) Appl. No.: 14/557,885

(22) Filed: Dec. 2, 2014

(65) Prior Publication Data

US 2016/0155128 A1    Jun. 2, 2016

(51) Int. Cl.
  *G06Q 20/32* (2012.01)
  *G06Q 20/40* (2012.01)
  *H04L 29/06* (2006.01)
  *G06F 21/44* (2013.01)

(52) U.S. Cl.
  CPC ......... *G06Q 20/3226* (2013.01); *G06F 21/44* (2013.01); *G06Q 20/3227* (2013.01); *G06Q 20/4016* (2013.01); *H04L 63/0876* (2013.01)

(58) Field of Classification Search
  CPC ......... G06Q 20/3226; G06Q 20/32678; G06Q 20/4016; H04L 63/0876
  See application file for complete search history.

(56) References Cited

U.S. PATENT DOCUMENTS

| | | | | |
|---|---|---|---|---|
| 7,370,356 | B1* | 5/2008 | Guo | G06Q 20/0855 370/254 |
| 2005/0289649 | A1* | 12/2005 | Mitomo | H04L 63/1416 726/22 |
| 2014/0123255 | A1* | 5/2014 | Etchegoyen | G06F 21/44 726/7 |
| 2016/0125490 | A1* | 5/2016 | Angal | G06Q 30/0609 705/26.35 |

* cited by examiner

*Primary Examiner* — Catherine Thiaw
*Assistant Examiner* — Wayne An
(74) *Attorney, Agent, or Firm* — Sage Patent Group

(57) ABSTRACT

A method of identifying a device includes receiving a device transaction request from a remote device, receiving a first device fingerprint of the remote device, and receiving a second device fingerprint of a known device. The first device fingerprint is compared with the second device fingerprint and a first metric indicative of a similarity of the first device fingerprint and the second device fingerprint is generated. A third device fingerprint corresponding to an expected current value of the second device fingerprint is generated, and the first device fingerprint is compared with the third device fingerprint to generate a second metric indicative of a similarity of the first device fingerprint and the third device fingerprint. A response to the transaction request is formulated based on the first metric and the second metric.

14 Claims, 6 Drawing Sheets

DEVICE IDENTIFICATION BASED ON DEEP FINGERPRINT INSPECTION

FIELD

Some embodiments of the inventive concepts relate to identification of devices. In particular, some embodiments relate to identification of devices using device fingerprints.

BACKGROUND

Financial transactions, such as banking transactions, online purchases, etc., are increasingly being performed with mobile computing devices, such as mobile phones, tablets, etc. This means that users are increasingly conducting financial transactions from different locations and using different devices, whereas users previously tended to use the same terminals, such as a work computer and/or a home computer to conduct such transactions. As the number of mobile transactions increases, it has become more important, and more difficult, to monitor such transactions for fraud.

Some existing fraud prevention solutions attempt to identify a device that is used for conducting the transaction. Once a fraudulent transaction is determined to have originated from a particular device, the device can be added to a negative list, i.e. a list of devices known to have been used to conduct fraudulent transactions. This can deter bad actors ("fraudsters") from using the same device to conduct subsequent fraudulent activities.

Existing device identification solutions may use a combination of a device ID and a device fingerprint to positively identify a particular device. A device ID is a time-stamped token stored on a user device. This token could possibly be encrypted, and can be retrieved at any time and used to uniquely identify a particular device. However, it may be easy for a fraudster to steal this token and move it to another machine. Moreover, a user device may block the storage or the cookie or token. Thus, a device ID may or may not be present on a particular device.

A device fingerprint is a collection of data elements that are obtained from the device and that can be used to identify the device. The data elements are based on the configuration of the device and/or the operational characteristics of the device, and can include elements such as browser type, browser revision number, operating system, screen attributes, etc. Device fingerprints are also referred to as "machine fingerprints" or simply "fingerprints." A browser fingerprint is a device fingerprint generated from information about the configuration of a web browser on the device. Device fingerprints can be used to fully or partially identify individual users or devices even when cookies are turned off.

It has been estimated that browser fingerprinting can generate a signature having 18.1 bits of entropy, and that another 5.7 bits of entropy can be added from so-called "canvas fingerprinting," in which a browser is instructed to draw a hidden image, and information about the CPU or graphics driver of the device can be inferred from the image.

As will be appreciated from the foregoing description, device fingerprinting can take the form of passive fingerprinting, in which configuration data is obtained without overtly querying the device for information, and active fingerprinting, in which the device is directly queried for information. In general, passive collection of device attributes below the web-browser layer may occur at several layers of the OSI communications model. In normal operation, various network protocols transmit or broadcast packets or headers from which client configuration parameters can be inferred. Examples of such protocols are FTP, HTTP, Telnet, TLS/SSL, DHCP, SNMP, NetBIOS, TCP, IPv4, IPv6, ICMP, IEEE 802.11, SMB, and CDP.

In addition to canvas fingerprinting, active fingerprinting may involve placing executable code directly on the device. Such code may have access to attributes not typically available by other means, such as the MAC address, or other unique serial numbers assigned to the machine hardware.

SUMMARY

A method of identifying a device according to some embodiments includes receiving a device transaction request from a remote device, receiving a first device fingerprint of the remote device, and receiving a second device fingerprint of a known device. The method includes comparing the first device fingerprint with the second device fingerprint and responsively generating a first metric indicative of a similarity of the first device fingerprint and the second device fingerprint. The method further includes generating a third device fingerprint corresponding to an expected current value of the second device fingerprint. The method further includes comparing the first device fingerprint with the third device fingerprint and responsively generating a second metric indicative of a similarity of the first device fingerprint and the third device fingerprint, and generating a response to the transaction request based on the first metric and the second metric.

The known device may be a known good device, and the response to the transaction request may include proceeding with the transaction in response to second metric indicating that the first device fingerprint matches the third device fingerprint.

When the known device is a known fraud device, and the response to the transaction request may include rejecting the transaction in response to second metric indicating that the first device fingerprint matches the third device fingerprint.

The response to the transaction request may be to request additional authentication data from the remote device when the first and second metrics indicate that the first device fingerprint does not match the second or third device fingerprints.

The second device fingerprint may include an operating system version level, and generating the third device fingerprint may include updating the operating system version level to a recent software version level and storing the updated operating system version level in the third device fingerprint.

The second device fingerprint may include an application software version level, and generating the third device fingerprint may include updating the application software version level to a recent software version level and storing the application software browser version level in the third device fingerprint.

Updating the application software version level may include retrieving an update history associated with the second device fingerprint, and updating the application software version level based on the update history associated with the second device fingerprint.

The method may further include analyzing an internal consistency of the first device fingerprint, and generating a third metric indicative of the internal consistency of the first device fingerprint.

Analyzing the internal consistency of the first device fingerprint may include receiving hardware and software version information associated with the first device, and comparing the hardware and software version information to determine if they are compatible.

Analyzing the internal consistency of the first device fingerprint may include receiving hardware version information associated with the first device, determining a clock speed of the first device, and determining if the clock speed of the first device is consistent with the hardware version information associated with the first device.

Analyzing the internal consistency of the first device fingerprint may include receiving a reported time zone associated with the first device, receiving geolocation information for the first device, and determining if the reported time zone information of the first device is consistent with the geolocation information for with the first device.

A method of identifying a device according to further embodiments includes receiving a device transaction request from a remote device, receiving a first device fingerprint of the remote device, and determining if the first device fingerprint matches any of a first plurality of device fingerprints of known good devices. If the first device fingerprint does not match any of the plurality of device fingerprints of known good devices, the method determines if the first device fingerprint matches any of a second plurality of device fingerprints of known fraud devices or if the first device fingerprint matches an expected modification of any of the second plurality of device fingerprints of known fraud devices. If the first device fingerprint matches any of the second plurality of device fingerprints or an expected modification of any of the second plurality of device fingerprints, the method includes rejecting the transaction or requiring additional verification before proceeding with the transaction.

The method may further include, if the first device fingerprint matches one of the first plurality of device fingerprints, determining if the first device fingerprint matches an expected modification of the one of the first plurality of device fingerprints. If the first device fingerprint does not match the expected modification of the one of the first plurality of device fingerprints, the transaction may be rejected or additional verification may be required before proceeding with the transaction. If the first device fingerprint matches an expected modification of the one of the first plurality of device fingerprints, the transaction is authorized.

The method may further include, if the first device fingerprint does not match any of the second plurality of device fingerprints and does not match an expected modification of any of the second plurality of device fingerprints, determining of the first device fingerprint is a plausible device fingerprint, and if the first device fingerprint is a plausible device fingerprint, authorizing the transaction.

The method may further include, if the first device fingerprint is not a plausible device fingerprint, rejecting the transaction or requiring additional verification before proceeding with the transaction.

The method may further include storing the first device fingerprint in a database after determining that the first device fingerprint matches an expected modification of the one of the first plurality of device fingerprints.

A transaction server according to some embodiments includes a processing unit and a memory including a fingerprint analysis module. The transaction server receives a device transaction request from a remote device, receives a first device fingerprint of the remote device, and receives a second device fingerprint of a known device. The fingerprint analysis module compares the first device fingerprint with the second device fingerprint and responsively generating a first metric indicative of a similarity of the first device fingerprint and the second device fingerprint, generates a third device fingerprint, the third device fingerprint including an expected current value of the second device fingerprint, compares the first device fingerprint with the third device fingerprint and responsively generating a second metric indicative of a similarity of the first device fingerprint and the third device fingerprint, and generates a response to the transaction request based on the first metric and the second metric.

It is noted that aspects of the inventive concepts described with respect to one embodiment may be incorporated in a different embodiments although not specifically described relative thereto. That is, all embodiments and/or features of any embodiments can be combined in any way and/or combination. These and other objects and/or aspects of the present inventive concepts are explained in detail in the specification set forth below.

Other systems, methods, and/or computer program products will be or become apparent to one with skill in the art upon review of the following drawings and detailed description. It is intended that all such additional systems, methods, and/or computer program products be included within this description, be within the scope of the present inventive concepts, and be protected by the accompanying claims.

BRIEF DESCRIPTION OF THE DRAWINGS

The accompanying drawings are included to provide a further understanding of the disclosure and are incorporated in and constitute a part of this application. In the drawings.

DETAILED DESCRIPTION OF EMBODIMENTS

Figure 1A:
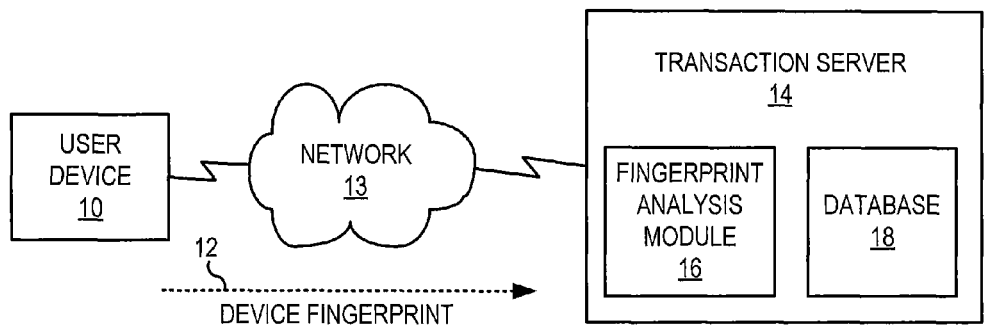
FIGS. 1A and 1B are block diagrams that illustrate transaction servers in accordance with some embodiments.

Embodiments of the present inventive concepts now will be described more fully hereinafter with reference to the accompanying drawings. The inventive concepts may, however, be embodied in many different forms and should not be construed as limited to the embodiments set forth herein. Rather, these embodiments are provided so that this disclosure will be thorough and complete, and will fully convey the scope of the inventive concepts to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present inventive concepts. As used herein, the term "or" is used nonexclusively to include any and all combinations of one or more of the associated listed items.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises," "comprising," "includes" or "including" when used herein, specify the presence of stated features, integers, steps, operations, elements, or components, but do not preclude the presence or addition of one or more other features, integers, steps, operations, elements, components, or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

As explained above, a device fingerprint may include, for example, machine hardware and software configuration, serial numbers and versions, processor speed, memory speed, graphics capabilities, memory latency, actual and relative machine load and power supply characteristics. The device fingerprint may further include attributes and characteristics of the machine processor, memory, hard disk, graphics card, etc. The device fingerprint may further include information regarding the user interface, for example the browser type and browser version of the user interface.

Device fingerprinting can be used to identify devices that have been used to conduct fraudulent transactions. However, there are some drawbacks associated with existing device identification techniques. In particular, device fingerprints do not remain static over time. As the characteristics, settings, software versions, etc., on the device change, such as when a new version of a browser or device driver is installed, the device's fingerprint also changes.

For example, internet browsers typically receive a new software release every six to eight weeks. To keep current with enhancements, bug fixes and security updates, a device may be set to automatically upgrade the browser when a new version is available. This process can cause device fingerprints to change fairly frequently.

In order to identify a device using its device fingerprint, device identification solutions typically employ techniques, such as threshold percentage matching. In such an approach, a fingerprint received from an unknown device is compared with known device fingerprints. The result of the comparison is quantified as a percentage match based on the percentage of fingerprint data that match. If the device fingerprint of the unknown device matches a known device fingerprint by a percentage that exceeds a certain threshold, the unknown device is considered to be a match to the device associated with the known fingerprint.

As an example, if a device fingerprint of an unknown device includes a data element for Safari version 8 and the known device fingerprint includes a data element for Safari 7, then the device fingerprint can still be considered as a match if the overall percentage by which the unknown fingerprint matches the known fingerprint exceeds the threshold.

This approach for determining the identity of an unknown device using device fingerprints leads to possibilities for fraudsters to mount attacks, such as attacks in which the fraudster impersonates a legitimate user's device without getting control of the user's device itself. If the fraudster is able to successfully impersonate a legitimate device, the fraudster may be able to execute a fraudulent transaction without being detected.

A fraudster may perform such an attack using one of two common approaches. For example, in one approach, a fraudster may capture a device fingerprint from a legitimate device and replay it when attempting to conduct a transaction. The fraudster can employ a series of attacks, such as network packet sniffing and/or man in the middle attacks, to capture a set of device fingerprints that are sent to the server by devices used by legitimate users. The fraudster can then replay the fingerprint in an attempt to the server to identify the device as a legitimate device.

In another approach, the fraudster may construct a fingerprint by assembling the elements of a device fingerprint in a format that would be expected by the system. For example, the fraudster may construct a fingerprint by combining frequently occurring combinations of device elements into a particular fingerprint that is submitted it to a server. If the fingerprint does not match at the server, the fraudster can repeat the attack multiple times, each time making minor changes to the fingerprint elements until the server considers the incoming fingerprint as a match to a known good device.

The fraudster can then impersonate the legitimate device and potentially bypass one or more fraud prevention checks that the system would have otherwise enforced.

Some embodiments provide systems/methods that use enhanced device fingerprint matching algorithms at a server. The algorithms may incorporate adaptive, self-learning techniques that provide increasingly more accurate evaluations of device fingerprints with reduced instance of false negative and/or false positive results. These systems/methods perform deep inspection of the fingerprint elements and responsively generate a fingerprint matching metric that takes into account not only the unknown and known device fingerprints, but also takes into account expected changes to device fingerprints so that implausible device fingerprints can be identified.

The scoring may be done in real time, and the algorithm(s) may use unsupervised learning mechanisms that provide the ability to learn based on a set of real time data feeds.

Systems/methods described herein may be employed to address at least three different potential scenarios. In a first scenario, a fraud device has cloned/copied a fingerprint of a known good device. In that scenario, the systems/methods attempt to recognize that the known good fingerprint has been copied, even though the unknown device fingerprint matches the known device fingerprint. In a second scenario, a fraud device has created a false fingerprint to use in place of its actual fingerprint. In that scenario, the system attempts to recognize that a false fingerprint has been submitted. In a third scenario, a fraud device whose fingerprint is known (i.e., a known bad device) has modified its fingerprint and attempts to execute a transaction using the modified fingerprint. In that case, the systems/methods attempt to recognize that a known bad fingerprint has been modified.

FIG. 1A is a generalized illustration of an environment in which embodiments of the inventive concepts may be employed. Referring to FIG. 1, a user device 10 may initiate a transaction by sending a transaction request 12 over a network 13 to a transaction server 14. The user device 10 may be any mobile or non-mobile computing device that is appropriately configured to communicate with the transaction server 14 over the network 13, and may include a device, such as a personal computer, a laptop computer, a tablet computer, a smartphone, a personal digital assistant, or other device configured for online access. The user device may access the network 13 through a user interface, which may be a browser such as Internet Explorer™, Google Chrome™, Apple Safari™, or Mozilla Firefox™, or any another mechanism configured as a user interface, such as Adobe Reader™. The network 13 may include a publicly accessible packet-switched network, such as the internet. Accordingly, the user device 10 may be known only by an IP address, and the precise physical location of the user device 10 may be unknown to the transaction server 14, although the transaction server 14 may be able to use techniques, such as geolocation, to obtain a coarse location of the user device 10, as discussed in more detail below.

The transaction server 14 may receive or generate a device fingerprint of the user device 10 based on information contained in the transaction request 12, and/or based on information queried from the user device 10. The transaction server 14 includes a fingerprint analysis module 16 and a database 18 of device fingerprint information. The fingerprint analysis module 16 may analyze the device fingerprint of the user device 10 against fingerprint information stored in the database 18 in an attempt to identify the user device 10. In particular, the fingerprint analysis module 16 may attempt to determine if the user device 10 is a previously known device or an unknown device, or if the fingerprint of the device is a forgery or fabrication.

For example, the fingerprint analysis module 16 may attempt to determine if the user device 10 is a known good device (i.e. a device that is already known to be authentic, and therefore may be trusted), or a known bad device (i.e., a device that is already known to have been associated with fraudulent transactions, and therefore not to be trusted).

If the device is determined to be an unknown device, the fingerprint analysis module 16 may attempt to determine if the user device 10 is likely to have a forged or fabricated device fingerprint, and therefore should be subjected to additional security screening before allowing the transaction to continue.

Figure 1B:
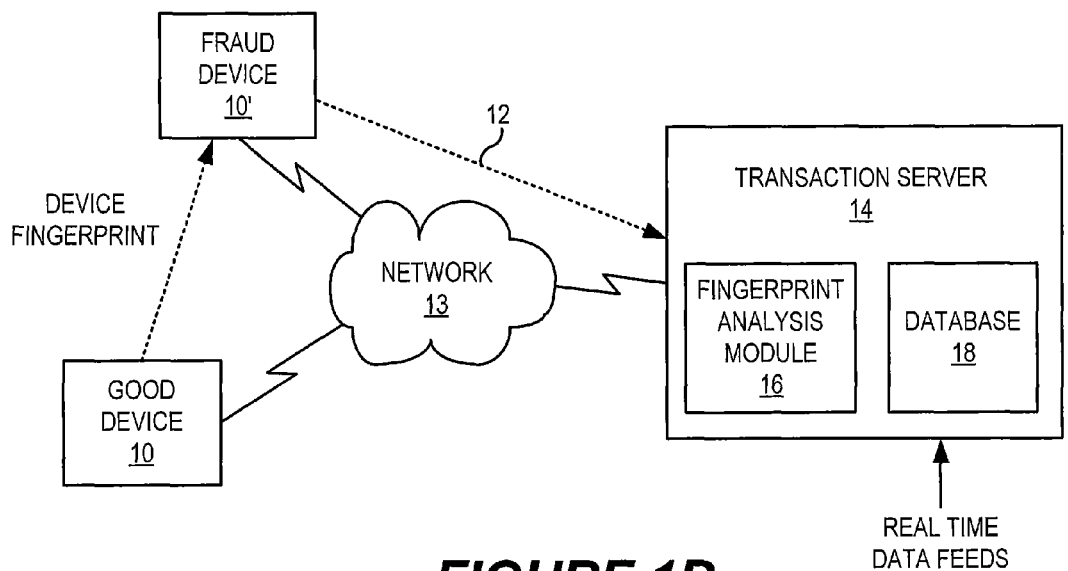

FIG. 1B illustrates a fraud device 10' in addition to a known good device 10 and the transaction server 14. As illustrated in FIG. 1B, the fraud device (or a user of the fraud device) may unlawfully obtain the device fingerprint of the good device 10 and send a transaction request 12 to the transaction server 14 including the stolen device fingerprint in attempt to trick the transaction server into allowing the device 10' to execute a transaction. In another aspect, the fraud device 10' may fabricate a device fingerprint and send a transaction request 12 to the transaction server 14 including the fabricated device fingerprint in attempt to trick the transaction server into allowing the device 10' to execute a transaction.

The transaction server 14 may utilize data collected from real time data feeds, as described in more detail below, that contain information regarding current software version/revision levels, permitted software and/or hardware configurations, device hardware capabilities, aggregated device information, etc., to analyze the device fingerprint associated with a received transaction request.

Figure 2:
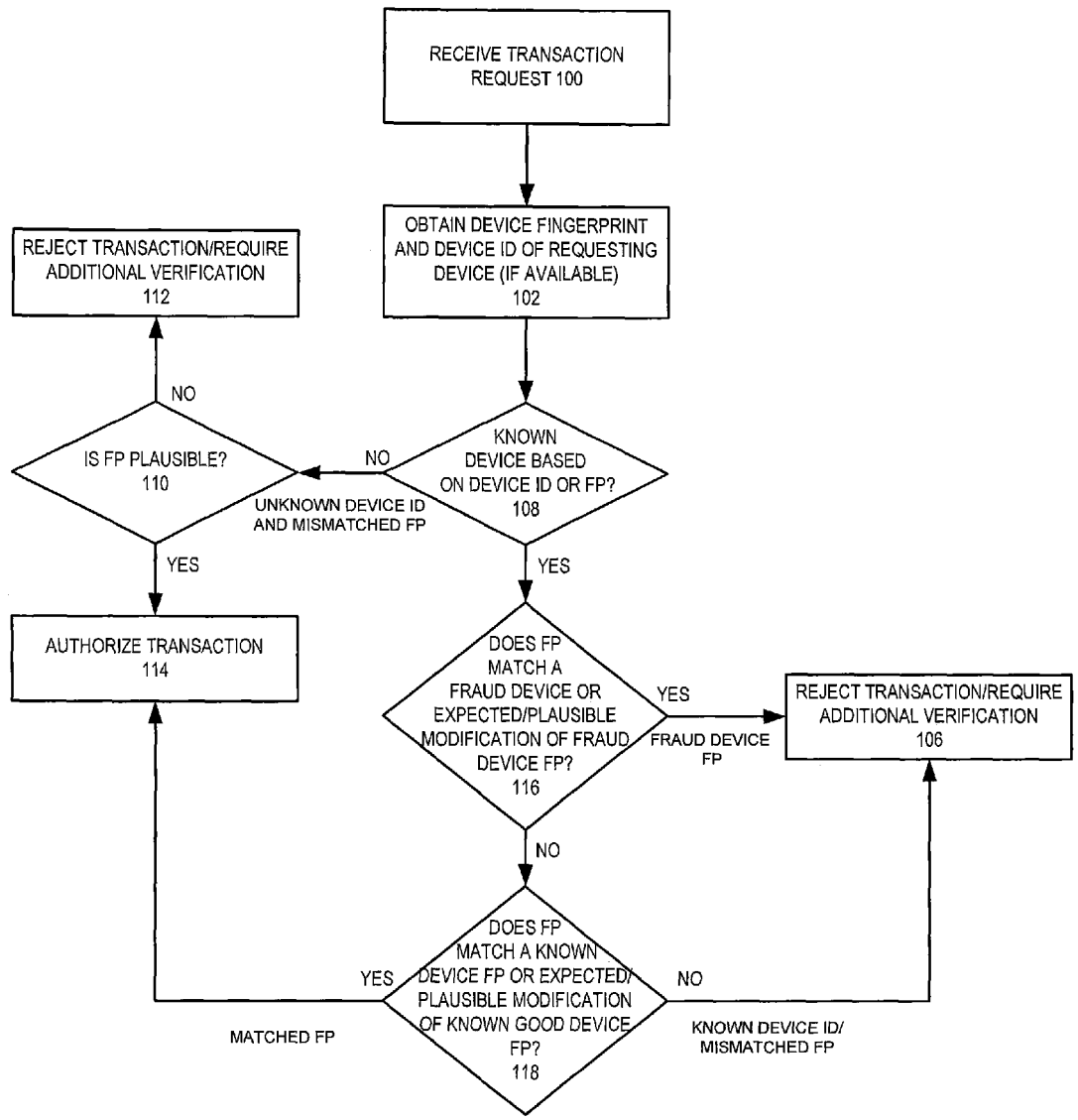
FIGS. 2, 3, 4 and 5 are flowcharts that illustrate operations of systems/methods in accordance with some embodiments.

Systems/methods according to some embodiments may utilize operations illustrated in FIG. 2. Referring to FIGS. 1 and 2, when a transaction server 14 receives a request 12 to execute a transaction (block 100), the transaction server 14 obtains a device fingerprint of the device 10 that initiated the transaction (block 102).

Next, the transaction server 14 determines if it recognizes the device 10 based on the device fingerprint matching a known fingerprint (or being a plausible modification of a known fingerprint using the fingerprint matching techniques described below) or based on a device ID provided by the device 10 (block 108).

If the device 10 is unknown (e.g. the device ID is not recognized and the fingerprint does not match any known fingerprint or expected modification of a known fingerprint), the transaction server 14 checks to see if the fingerprint is plausible based on the fingerprint matching vectors described in the disclosure (block 110) and either rejects the transaction if the fingerprint is implausible (block 112) or authorizes the transaction if the fingerprint is plausible (block 114).

If the device is recognized either based on the fingerprint or the device ID, the transaction server 14 checks to see if the fingerprint matched a known fraud device, or is an expected/plausible modification of a fingerprint of a known fraud device using the fingerprint matching vectors described in the disclosure (block 116). If so, the transaction is rejected (block 106).

If the fingerprint does not match a known fraud device, the transaction server 14 checks to see if the fingerprint matches (or is a plausible/expected modification of) a fingerprint of a known good device (block 118). If so, the transaction is authorized (block 114). If not, then the fingerprint does not match the fingerprint of the device known based on its device ID, so the transaction is rejected (block 106).

As an alternative to rejecting the transaction in block 112 and/or block 106, in some embodiments it may be desirable to provide a different response to the user device. For example, the system may respond by requiring additional verification before authorizing a transaction, such as requiring secondary password validation, entry of a personal identification number, secure token validation, or other means. Other possible responses include disabling a password or account, denying access to the provider interface and/or terminating a session.

Figure 3:
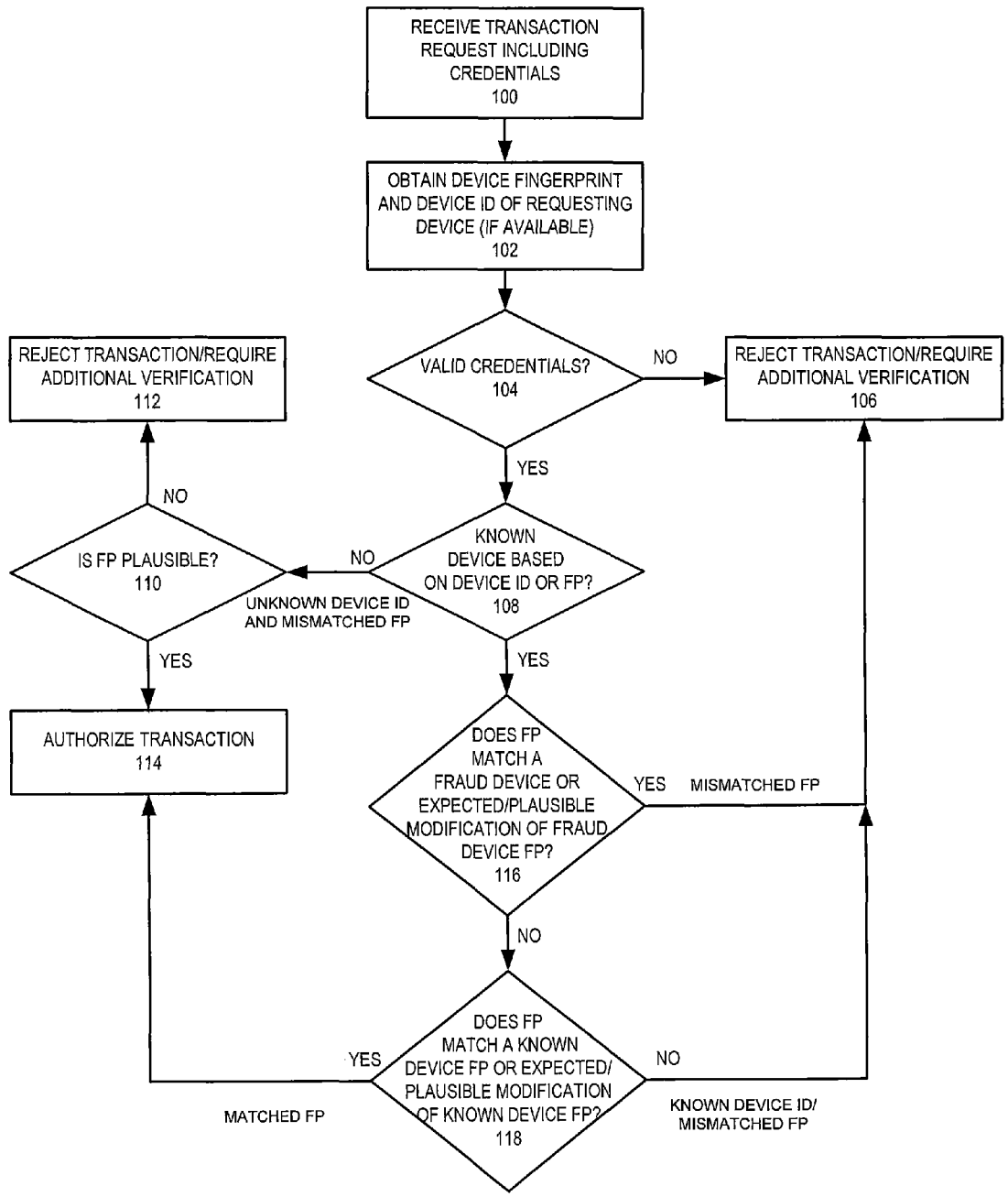

FIG. 3 illustrates operations according to further embodiments. The operations illustrated in FIG. 3 are similar to the operations of FIG. 2, except that in FIG. 3, the transaction request includes credentials provided by the user device 10. The credentials may include a username/password combination, a personal identification number (PIN), an encrypted string, or other data provided to authenticate the transaction. After obtaining the device fingerprint of the user device 10 in block 102, the transaction server 14 checks to see if the credentials supplied by the user device 10 are valid (block 104). If the credentials are valid (e.g., the user device has submitted a valid password, PIN number, etc.), the operations continue to block 108. If the credentials supplied by the user device 10 are invalid, the transaction is rejected in block 106.

Figure 4:
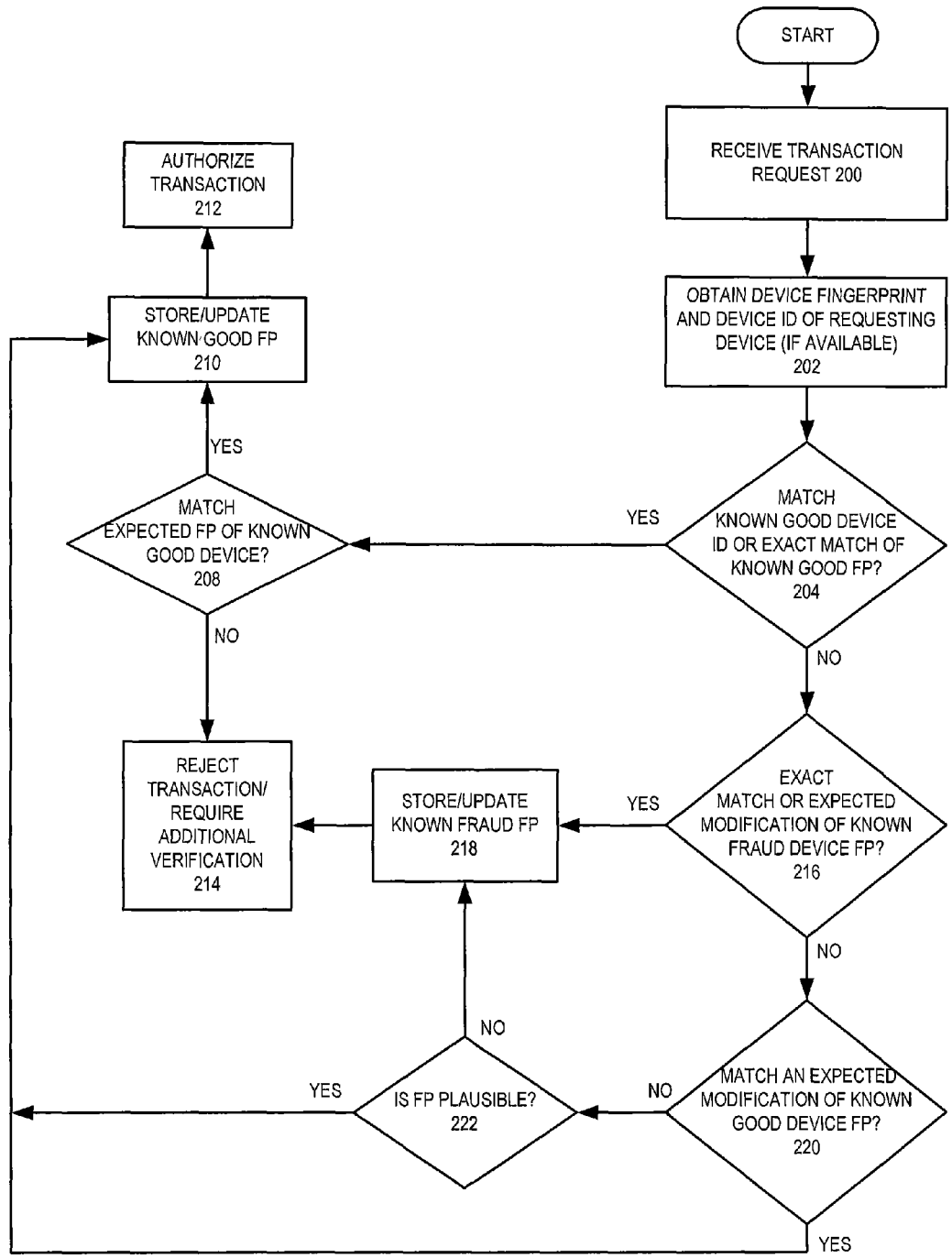

FIG. 4 illustrates operations according to still further embodiments. Referring to FIG. 4, operations begin when the transaction server 14 receives a transaction request from a user device 10 (block 200). The transaction server 14 obtains a device fingerprint and, if available, a device ID of the user device 10 (block 202).

The transaction server 14 then determines if the device ID matches the device ID of a known good device, or if the device fingerprint is an exact match of the device fingerprint of a known good device (block 204). If so, operations proceed to block 208, at which the transaction server 14 determines if the device fingerprint matches the expected device fingerprint of the known good device. That is, even if the device fingerprint is an exact match of the device fingerprint of a known good device, the systems/methods determine if the known device fingerprint is still the expected device fingerprint of the known device using the methods described below. For example, device fingerprints stored in the database 18 may be given a date stamp. Depending on the age of the fingerprint, it may be expected to have changed over time due to software updates, revisions etc. Thus, an exact match to an aged fingerprint may indicate that the fingerprint is not authentic.

If the received fingerprint does not match the expected current device fingerprint of the known device, the transaction may be rejected (block 214). Otherwise, the device fingerprint may be stored in the database 18 or updated with a new date stamp (block 210), and the transaction may be authorized (block 212).

Returning to block 204, if the received device fingerprint is not an exact match of a known good device fingerprint and a device ID is not available, then the systems/methods check to see if the device fingerprint is an exact match to a fingerprint of a known fraud device, or if the device fingerprint matches an expected current fingerprint of a known fraud device (block 216). If so, the systems/methods store/update the device fingerprint of the known fraud device (block 218) and reject the transaction (block 214).

If the received device fingerprint does not match a known fraud device, the systems/methods may next determine if the device fingerprint matches the expected current fingerprint of a known good device (block 220). If so, the systems/methods update the device fingerprint of the known good device (block 210) and authorize the transaction (block 212).

If the received device fingerprint does not match the fingerprint of an already known device at block 220, then the systems/methods analyze the device fingerprint to determine if it is a plausible fingerprint (block 222). For example, the systems/methods analyze the device fingerprint in the manner described in detail below to determine if the data in the fingerprint is internally consistent. If it is not, then the systems/methods may determine that the device fingerprint is fabricated, and then store the device fingerprint as a known fraud device fingerprint (block 218) and reject the transaction (block 214).

As will be appreciated from the illustrations in FIGS. 2-4 and associated descriptions, the operations associated with authorizing or rejecting a transaction based on device fingerprint identification may be implemented many different ways while remaining within the scope of the inventive concepts described herein. In some aspects, the algorithm may be designed to implement a logic table, such as the logic table shown below, that defines when a transaction should be authorized or rejected based on the device ID and device fingerprint.

TABLE 1

Analysis of Fingerprints

| DEV ID KNOWN | FP MATCH KD | FP MATCH FD | RESULT |
|---|---|---|---|
| NO | YES | NO | ALLOW |
| NO | DON'T CARE | YES | REJECT |
| NO | NO | NO | ALLOW IF PLAUSIBLE FP |
| YES | YES | NO | ALLOW |
| YES | DON'T CARE | YES | REJECT |
| YES | NO | NO | REJECT |

Referring to Table 1, the first column indicates whether or not the device ID of the device is known. The second column indicates whether or not the fingerprint (FP) matches a fingerprint of a known device (KD) or an expected modification of the fingerprint of a known device. The third column indicates whether or not the fingerprint (FP) matches a fingerprint of a known fraud device (FD) or an expected modification of the fingerprint of a known fraud device. If the device ID of the device associated with the transaction request is known as a good device, then the transaction may be authorized if the device fingerprint matches the expected device fingerprint of a known good device. Otherwise, the transaction may be rejected.

If the device ID is not available, then the transaction may be authorized if the device fingerprint matches the expected device fingerprint of a known good device and does not match the device fingerprint or expected device fingerprint of a known fraud device. If the device fingerprint matches the device fingerprint or expected device fingerprint of a known fraud device, the transaction will be rejected.

If the device fingerprint matches the expected device fingerprint of a known good device or the device fingerprint or expected device fingerprint of a known fraud device, the transaction may be authorized if the fingerprint is determined to be plausible, and rejected if it is not.

In evaluating whether a fingerprint matches a known fingerprint or an expected modification of a known fingerprint, the fingerprint analysis module 16 may perform a deep inspection of device fingerprints based on multiple vectors including, but not limited to the following:

1) Analysis based on time events
   2) Device hardware and software version compatibility
   3) Device form factor
   4) Device processing capability
   5) Geolocation based analysis
   6) Profiling based on device history patterns
   7) Profiling/Machine learning based on network level aggregation
   8) Fingerprint inspection using passive fingerprinting
   9) Network analysis Each of these vectors will now be described in detail.

Analysis Based on Time Events

Systems/methods according to some embodiments may perform scoring of the comparison of a received fingerprint with known/stored device fingerprints based on time/chronological sequence of events. This may be used to detect inconsistencies in the fingerprint element changes.

As an example, when a new version of a mobile operating system such as iOS is released, user adoption is typically extremely rapid. In contrast, user adoption may be less rapid in the case of other mobile operating systems.

When an incoming fingerprint element is received, the fingerprint analysis module 16 may generate a score that is based on the release date of software, such as the release date of a new version of an operating system, application program or internet browser.

Some embodiments may employ a real time feed for the fingerprint analysis module 16 that provides a time based function for probability of a user to upgrade the fingerprint element to the incoming version. The real-time feed may be obtained, for example, from a third party vendor. This can be used to detect replays of an old or out of date device fingerprint. If the incoming device fingerprint includes elements that indicate the software versions are significantly out of date, the device fingerprint may be flagged as implausible and therefore suspect. Whether an out of date software version is "significantly" out of date may depend on the software in question, the operating system of the device and/or the type of device associated with the fingerprint.

In addition, characteristics about the device, such as the release date of the software/hardware/network element associated with the device, the date for end of support, date of installation, etc., may be analyzed to determine the likelihood that an incoming transaction from a device is genuine.

Device Hardware and Software Version Compatibility

Systems/methods according to some embodiments may analyze the data elements of a fingerprint to determine if the device hardware and software settings are compatible. This may provide an indication as to whether a received device fingerprint is a plausibly valid fingerprint.

For example, some mobile device operating systems can only be upgraded on certain hardware devices. The systems/methods may check to see if the version level of the operating system in a device fingerprint is compatible with the hardware. For example, it is possible that devices from one manufacturer can be upgraded to a particular version of software, while devices from another manufacturer may not.

If a device fingerprint indicates software versions that are incompatible with the reported hardware of the device, the device may be flagged as suspect or fraudulent.

The transaction server 20 may also provide/obtain a real time feed to the fingerprint analysis module 16 for browser and OS version compatibility, as well as installed software compatibility.

Device Form Factor

In some cases, a device form factor may be limited to a specific set of values depending on the operating system, device manufacturer or other parameters.

For example, for a given version of an operating system, the screen coordinates can have only a specific set of values. The systems/methods may be receive a real time feed that provides data set for the screen coordinate ranges for a particular operating system version. The real time data feed may be obtained, for example, from a third party vendor. The screen coordinate values from the incoming fingerprint may be evaluated to check for validity in the allowed range.

Device Processing Capability

Device processing capability, which can be based, for example, on CPU clock speed, may be different depending on the type of device in question. For example, mobile devices have a certain set of available CPU architectures and/or clock speeds. Using machine effective speed calibration ("MESC"), which is described in U.S. Patent Publication No. 2014/0181488, which is assigned to the assignee of the present application and the disclosure of which is incorporated herein by reference, the CPU clock speed can be determined and compared with the type of device to determine if the device fingerprint is plausible. MESC can also be used as part of the device fingerprint, as different devices may have different CPU speeds even if they are nominally rated at the same speed.

The systems/methods may employ a real time feed with a range of MESC values for given device types. The real time data feed may be obtained, for example, from a third party vendor. When the device fingerprint is collected, the MESC value may be compared and verified against the range to verify that the device is legitimate.

Network Based Analysis

In some embodiments, the algorithm may use characteristics of the network that the device uses to connect to the server. As an example, a user may be unlikely to downgrade to a 2G connection from a 3G connection for a given device. Also, the Internet Service Provider (ISP) of the device user may enable secondary analysis of the acceptable range of values for the network connectivity and speed of the incoming connection from the device to the server. Such information may be used to predict whether or not a transaction initiated by a device is valid.

Geolocation Based Analysis

Systems/methods according to some embodiments may analyze geolocation, time zone and/or IP address information of the device associated with the fingerprint to detect inconsistencies in the device fingerprint. Thus, for example, if a reported time zone in the fingerprint does not match the geolocation associated with the IP address, the fingerprint may be flagged as suspect or fraudulent.

Profiling Based on Device History Patterns

Each device fingerprint profile analyzed by the fingerprint analysis module 16 is stored in the database 18 along with a date stamp, a geolocation and an associated device ID (if available). The systems/methods may build a profile based on the changes to the fingerprint profile elements that can be used to score the incoming profile. As an example, if a given device changes its browser version every six weeks, the systems/methods may determine that the device has been configured for automatic upgrades to the browser. The device profile may be used as a predictive indicator of subsequent fingerprint changes. Thus, the scoring logic can use this indicator to detect inconsistencies in an incoming device fingerprint.

Profiling/Machine Learning Based on Network Level Aggregation

The systems/methods may be self-learning in that they may use network level aggregation to determine new changes to the device fingerprint elements. As an example, when a new version of a software element such as browser is released by the vendor, the algorithm may learn about the new version of the browser by aggregating received information. Thus, for example, the systems/methods may learn about new version upgrades from received device fingerprints of known good devices. As more devices are encountered with the new version, the systems/methods may have an increased confidence in the validity of the version upgrade.

The scoring may be updated in real time with automated, unsupervised mechanisms that can enable the systems/methods to detect valid fingerprint elements and also identify outliers as potentially invalid.

Fingerprint Inspection Using Passive Fingerprinting

The systems/methods may perform passive device fingerprinting using information that is obtained from the network connection that the device establishes with the server. As noted above, passive collection of device attributes below the web-browser layer may occur at several layers of the OSI communications model. In normal operation, various network protocols transmit or broadcast packets or headers from which client configuration parameters can be inferred.

For example, device fingerprint elements obtained from the application layer packet can be correlated with information from the passive fingerprinting technique. This may be useful in identifying attacks where the fraudster captured a fingerprint and is replaying it from a different device.

Figure 5:
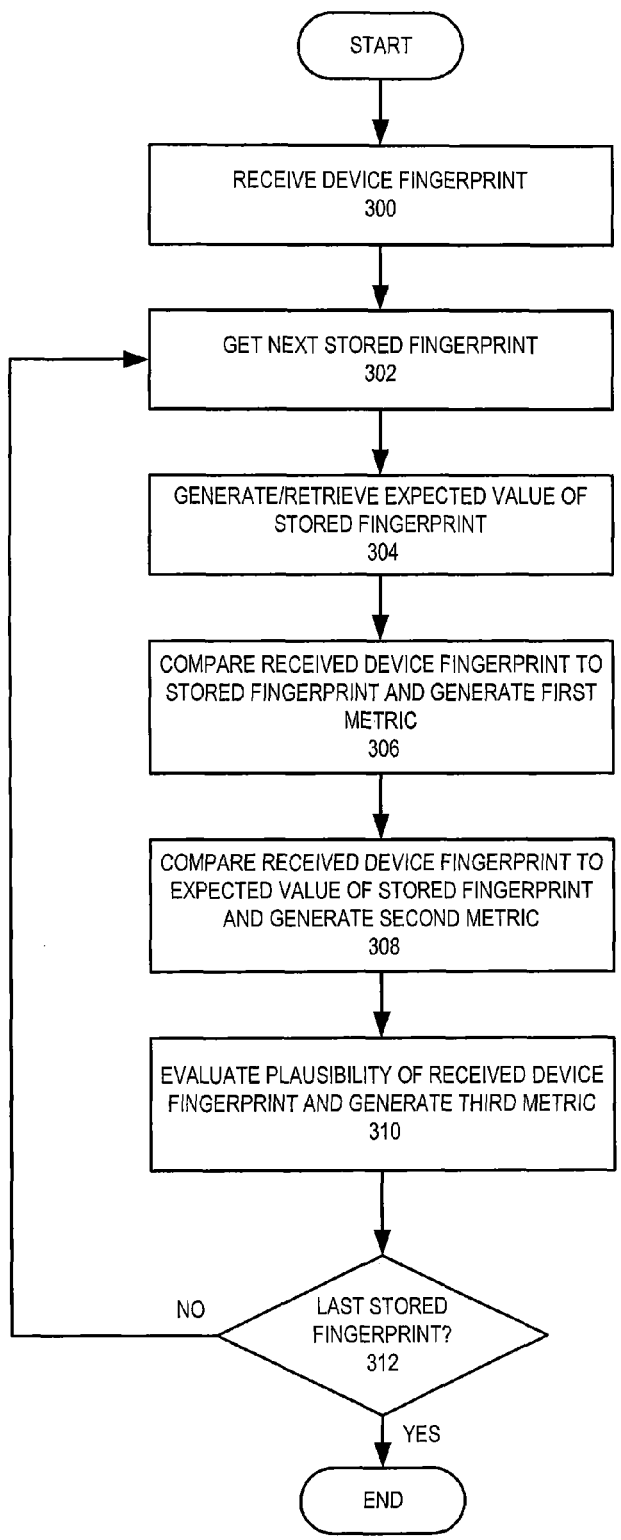

Accordingly, each received device fingerprint may be analyzed by comparing it to each stored device fingerprint as well as to the expected current value of each stored device fingerprint. Each comparison may result in the generation of a metric, such as a percentage match between the received device fingerprint and the stored device fingerprint. A metric may also be generated that quantifies a plausibility of the received device fingerprint. These operations are illustrated in the flowchart of FIG. 5. As shown therein, when a device fingerprint is received (block 300), a stored device fingerprint is retrieved from the database 18 (FIG. 1A) in block 302.

The expected current value of the stored device fingerprint is then generated or retrieved from the database 18 (block 304). The expected current value of the stored device fingerprint May be generated, for example, in response to expected updates or changes in software and/or firmware versions identified in the stored device fingerprint using the techniques described above. The expected current value of a stored device fingerprint may be generated, at least in part, based on a stored history of device updates for the device in question, as described above.

In some embodiments, the expected current values of the stored device fingerprints may be continually updated offline and stored in the database 18 together with the original values of the stored device fingerprints. Additionally, a history of device fingerprints for a particular known device may be stored in the database 18 and analyzed in determining an expected current value of the device fingerprint of the device.

The systems/methods then compare the received device fingerprint with the stored device fingerprint and, responsive to the comparison, generate a first metric that quantifies the degree of similarity of the received device fingerprint and the stored device fingerprint (block 306).

Similarly, the systems/methods compare the received device fingerprint with the expected current value of the stored device fingerprint and, responsive to the comparison, generate a second metric that quantifies the degree of similarity of the received device fingerprint and the expected current value of the stored device fingerprint (block 308).

The systems/methods then generate a third metric that quantifies the degree of plausibility of the received device fingerprint (block 310). The third metric may be based on the number of inconsistencies in the received device fingerprint, such as inconsistencies between various reported software configurations, inconsistencies between reported hardware and software combinations, inconsistencies between reported version levels and current version levels, etc.

The inconsistencies may be weighted equally or may be weighted differently based on a, relative importance of a particular inconsistency. For example, an inconsistency between reported version levels and current version levels of a particular operating system or browser (which may be possible but unlikely) may be weighted less than an inconsistency between a reported device type and a reported hardware configuration (which may be impossible).

The systems/methods then check to see if the last stored fingerprint has been checked (block 312), and if not, operations return to block 302 where the next stored fingerprint is retrieved. Otherwise, the operations terminate.

The metrics generated in these operations may be used in the evaluation blocks of FIGS. 2-4. For example, the first and second metrics may be used to determine if a device is known based on its device fingerprint in block 108 of FIG. 2. The second metric may be used to determine if the device fingerprint matches an expected modification of a fingerprint of a known device in blocks 116 and 118 of FIG. 2. The third metric may be used in block 110 of FIG. 2 to determine if the received device fingerprint is a plausible fingerprint.

Figure 6:
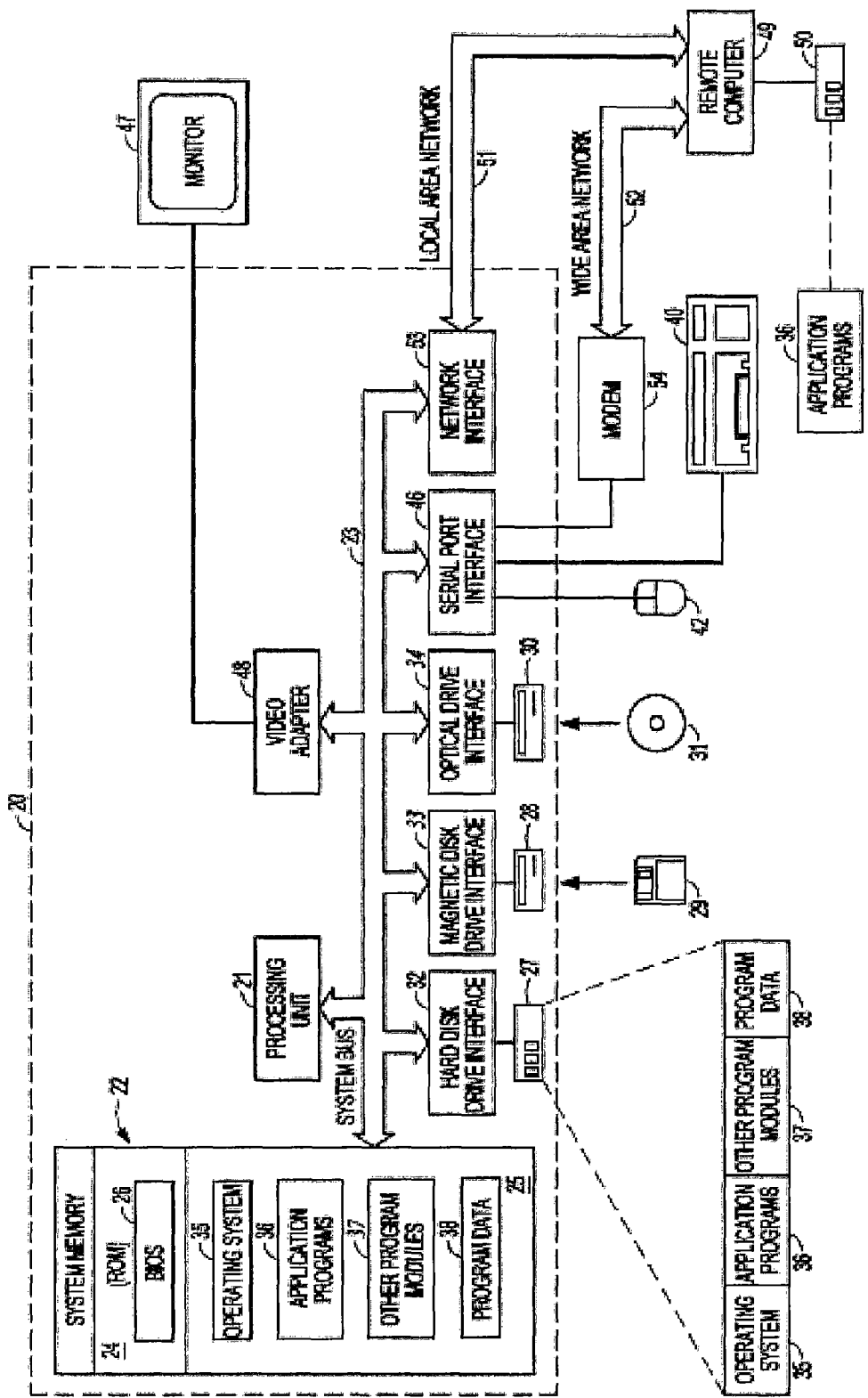
FIG. 6 is a block diagram that illustrates a suitable computer hardware and computing environment in which various embodiments may be implemented.

FIG. 6 provides an overview diagram of a suitable computer hardware and computing environment in conjunction with which various embodiments may be implemented. In particular, the hardware environment illustrated in FIG. 6 may be used to implement one or both of the tenant application 100 and the connector service 200. The description of FIG. 6 is intended to provide a brief, general description in conjunction with which the embodiments may be implemented. Some embodiments are described in the general context of computer-executable instructions, such as program modules, being executed by a computer, such as a personal computer. Generally, program modules include routines, programs, objects, components, data structures, and the like, that perform particular tasks or implement particular abstract data types.

In the embodiment shown in FIG. 6, a hardware and operating environment is provided that is applicable to the various software applications and tools described in the other figures and described above. It can be appreciated that the following hardware and operating environment might be used in connection with the development of the software application to be tested, the use and operation of the test case automation tool, the use and operation of integrated third party test tools, or the deployment of the software application to be tested.

Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. As used herein, a "processor" includes one or more processors, microprocessors, computers, co-processors, graphics processors, digital signal processors, arithmetic logic units, system-on-chip processors, etc. The invention may also be practiced in distributed computer environments where tasks are performed by I/O remote processing devices that are linked through a communications network. In a distributed computing environment, program modules may be located in both local and remote memory storage devices.

In the embodiment shown in FIG. 6, a hardware and operating environment is provided that is applicable to any of the servers or remote clients shown in the other figures. As shown in FIG. 6, one embodiment of the hardware and operating environment includes a general purpose computing device in the form of a computer 20 (e.g., a personal computer, workstation, or server), including one or more processing units 21, a system memory 22, and a system bus 23, that operatively couples various system components, including the system memory 22 to the processing unit 21. There may be only one or more than one processing unit 21, such that the processor of computer 20 comprises a single central-processing unit (CPU), or a plurality of processing units, commonly referred to as a multiprocessor or parallel-processor environment. A multiprocessor system can include cloud computing environments. In various embodiments, computer 20 is a conventional computer, a distributed computer, or any other type of computer.

The system bus 23 can be any of several types of bus structures including a memory bus or memory controller, a peripheral bus, and a local bus using any of a variety of bus architectures. The system memory 22 can also be referred to as simply the memory, and, in some embodiments, includes read-only memory (ROM) 24 and random-access memory (RAM) 25. A basic input/output system (BIOS) program 26, containing the basic routines that help to transfer information between elements within the computer 20, such as during start-up, may be stored in ROM 24. The computer 20 further includes a hard disk drive 27 for reading from and writing to a hard disk (not shown), a magnetic disk drive 28 for reading from or writing to a removable magnetic disk 29, and an optical disk drive 30 for reading from or writing to a removable optical disk 31, such as a CD-ROM or other optical media.

The hard disk drive 27, magnetic disk drive 28, and optical disk drive 30 couple with a hard disk drive interface 32, a magnetic disk drive interface 33, and an optical disk drive interface 34, respectively. The drives and their associated computer-readable media provide non volatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the example operating environment.

A plurality of program modules can be stored on the hard disk, magnetic disk 29, optical disk 31, ROM 24, or RAM 25, including an operating system 35, one or more application programs 36, other program modules 37, and program data 38. Programming for implementing one or more processes or methods described herein may be resident on any one or number of these computer-readable media.

A user may enter commands and information into computer 20 through input devices such as a keyboard 40 and pointing device 42. Other input devices (not shown) can include a microphone, joystick, game pad, satellite dish, scanner, or the like. These other input devices are often connected to the processing unit 21 through a serial port interface 46 that is coupled to the system bus 23, but can be connected by other interfaces, such as a parallel port, game port, or a universal serial bus (USB). A monitor 47 or other type of display device can also be connected to the system bus 23 via an interface, such as a video adapter 48. The monitor 40 can display a GUI for the user. In addition to the monitor 40, computers typically include other peripheral output devices (not shown), such as speakers and printers.

The computer 20 may operate in a networked environment using logical connections to one or more remote computers or servers, such as remote computer 49. These logical connections are achieved by a communication device coupled to the computer 20, or a part of the computer 20; the invention is not limited to a particular type of communications device. The remote computer 49 can be another computer, a server, a router, a network PC, a client, a peer device or other common network node, and typically includes many or all of the elements described above I/O relative to the computer 20, although only a memory storage device 50 has been illustrated. The logical connections depicted in FIG. 6 include a local area network (LAN) 51 or a wide area network (WAN) 52. Such networking environments are commonplace in office networks, enterprise-wide computer networks, intranets and the Internet, which are all types of networks.

When used in a LAN-networking environment, the computer 20 is connected to the LAN 51 through a network interface or adapter 53, which is one type of communications device. In some embodiments, when used in a WAN-networking environment, the computer 20 typically includes a modem 54 (another type of communications device), or any other type of communications device (e.g., a wireless transceiver), for establishing communications over the WAN 52, such as the internet. The modem 54, which may be internal or external, is connected to the system bus 23 via the serial port interface 46. In a networked environment, program modules depicted relative to the computer 20 can be stored in the remote memory storage device 50 of remote computer/server 49. It is appreciated that the network connections shown are examples of, and communications devices for, establishing a communications link between the computers may be used including hybrid fiber-coax connections, T1-T3 lines, DSL's, OC-3 or OC-12, TCP/IP, microwave, wireless application protocol, and any other electronic media through any suitable switches, routers, outlets and power lines, as the same are known and understood by one of ordinary skill in the art.

Methods and systems disclosed herein may facilitate access to private cloud enterprise service end points from a public cloud infrastructure. Access is provided in a payload agnostic way, which enables the system to be easily extended to any point-to-point protocol payloads. Access to the enterprise services is provided securely in a fashion which may reduce exposure to Denial of Service attacks. Moreover, implementing a system in accordance with some embodiments may not require any significant changes to the tenant's private cloud networking security infrastructure.

As will be appreciated by one of skill in the art, the present inventive concepts may be embodied as a method, data processing system, or computer program product. Furthermore, the present inventive concepts may take the form of a computer program product on a tangible computer usable storage medium having computer program code embodied in the medium that can be executed by a computer. Any suitable tangible computer readable medium may be utilized including hard disks, CD ROMs, optical storage devices, or magnetic storage devices.

Some embodiments are described herein with reference to flowchart illustrations or block diagrams of methods, systems and computer program products. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart or block diagram block or blocks.

These computer program instructions may also be stored in a computer readable memory that can direct a computer or other programmable data processing apparatus to function in a particular manner, such that the instructions stored in the computer readable memory produce an article of manufacture including instruction means which implement the function/act specified in the flowchart or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations described herein may be written in an object oriented programming language such as Java® or C++. However, the computer program code for carrying out operations described herein may also be written in conventional procedural programming languages, such as the "C" programming language. The program code may execute entirely on the user's computer, partly on the user's computer, as a standalone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed typical embodiments and, although specific terms are employed, they are used in a generic and descriptive sense only and not for purposes of limitation, the scope of the inventive concepts being set forth in the following claims.

What is claimed is:

1. A method of identifying a remote device at a transaction server comprising a processor and memory, the method comprising:
   receiving, at the transaction server, a device transaction request from the remote device in communication with the transaction server;
   receiving, at the transaction server, a first device fingerprint of the remote device;
   retrieving, by the transaction server, a second device fingerprint of a known device previously identified by the transaction server from a database comprising a plurality of known device fingerprints, wherein the first device and second device fingerprints each comprises an operating system version level or application version level information of the first device and the known device;
   comparing, at the transaction server, the first device fingerprint with the second device fingerprint and responsively generating a first metric indicative of a similarity of that the first device fingerprint matches the second device fingerprint by a quantity that exceeds a predetermined threshold;
   generating, at the transaction server, a third device fingerprint, the third device fingerprint comprising an expected current value of the second device fingerprint based on one or more expected changes to the second device fingerprint of the known device;
   comparing, at the transaction server, the first device fingerprint with the third device fingerprint and responsively generating a second metric indicative that the first device fingerprint matches the third device fingerprint by a quantity that exceeds another predetermined threshold;
   generating, at the transaction server, a response to the transaction request based on the first metric and the second metric; wherein the response to the transaction request comprises requesting a request for additional authentication data from the remote device in response to the first and second metrics indicating that the first device fingerprint does not match the second and third device fingerprints; and
   communicating, from the transaction server, the response to the remote device indicating an authorization status of the device transaction request based on the second metric.

2. The method of claim 1, wherein the known device comprises a known good device, and wherein the response to the transaction request comprises authorizing the transaction based on the second metric.

3. The method of claim 1, wherein the known device comprises a known fraud device, and wherein the response to the transaction request comprises rejecting the transaction based on the second metric.

4. The method of claim 1, wherein generating the third device fingerprint comprises:
   determining, at the transaction server, that a more recent version level of the operating system for the known device is available, when the first device and second device fingerprints each comprises the operating system version level of the first device and the known device;
   updating, at the transaction server, the operating system version level of the second device fingerprint to the more recent version level; and
   storing, by the transaction server in the database, the updated operating system version level in the third device fingerprint.

5. The method of claim 1, wherein generating the third device fingerprint comprises:
   determining, at the transaction server, that a more recent version level of the application software for the known device is available, when the first device and second device fingerprints each comprises the application software version level of the first device and the known device;
   updating, at the transaction server, the application software version level of the second device fingerprint to a recent application software version level; and
   storing, by the transaction server in the database, the updated application software version level in the third device fingerprint.

6. The method of claim 5, wherein updating the application software version level comprises:
   retrieving, by the transaction server, an update history associated with the second device fingerprint; and
   updating, at the transaction server, the application software version level based on the update history associated with the second device fingerprint.

7. The method of claim 1, further comprising:
   analyzing, at the transaction server, an internal consistency of the first device fingerprint; and
   generating, at the transaction server, a third metric indicative of the internal consistency of the first device fingerprint.

8. The method of claim 7, wherein analyzing the internal consistency of the first device fingerprint comprises:
   receiving, at the transaction server, hardware and software version information associated with the remote device; and
   comparing, at the transaction server, the hardware and software version information to determine if they are compatible.

9. The method of claim 7, wherein analyzing the internal consistency of the first device fingerprint comprises:
   receiving, at the transaction server, hardware version information associated with the remote device;
   determining, at the transaction server, a clock speed of the remote device; and determining, at the transaction server, if the clock speed of the remote device is consistent with the hardware version information associated with the remote device.

10. The method of claim 7, wherein analyzing the internal consistency of the first device fingerprint comprises:
receiving, at the transaction server, a reported time zone associated with the remote device;
receiving, at the transaction server, geolocation information for the remote device; and
determining, at the transaction server, if the reported time zone information of the remote device is consistent with the geolocation information for the remote device.

11. The method of claim 7, wherein analyzing the internal consistency of the first device fingerprint comprises:
receiving, at the transaction server, network information associated with the remote device; and comparing, at the transaction server, the network information to determine if the network information associated with the device is compatible with the remote device.

12. A transaction server comprising a processor and memory, the processor and the memory configured to identify a remote device at the transaction server by:
receiving, at the transaction server, a device transaction request from the remote device in communication with the transaction server;
receiving, at the transaction server, a first device fingerprint of the remote device;
retrieving, by the transaction server, a second device fingerprint of a known device previously identified by the transaction server from a database comprising a plurality of known device fingerprints, wherein the first device and second device fingerprints each comprises an operating system or application version level information of the first device and the known device;
comparing, at the transaction server, the first device fingerprint with the second device fingerprint and responsively generating a first metric indicative of a similarity of that the first device fingerprint matches the second device fingerprint by a quantity that exceeds a predetermined threshold;
generating, at the transaction server, a third device fingerprint, the third device fingerprint comprising an expected current value of the second device fingerprint based on one or more expected changes to the second device fingerprint of the known device;
comparing, at the transaction server, the first device fingerprint with the third device fingerprint and responsively generating a second metric indicative that the first device fingerprint matches the third device fingerprint by a quantity that exceeds another predetermined threshold;
generating, at the transaction server, a response to the transaction request based on the first metric and the second metric, wherein the response to the transaction request comprises requesting a request for additional authentication data from the remote device in response to the first and second metrics indicating that the first device fingerprint does not match the second and third device fingerprints; and
communicating, from the transaction server, the response to the remote device indicating an authorization status of the device transaction request based on the second metric.

13. The transaction server of claim 12, wherein the known device comprises a known good device, and wherein the response to the transaction request comprises processing the transaction in response to the second metric indicating that the first device fingerprint matches the third device fingerprint.

14. The transaction server of claim 12, wherein the known device comprises a known fraud device, and wherein the response to the transaction request comprises rejecting the transaction in response to the second metric indicating that the first device fingerprint matches the third device fingerprint.

* * * * *